(12) United States Patent
Legge et al.

(10) Patent No.: US 11,200,896 B2
(45) Date of Patent: Dec. 14, 2021

(54) MULTI-HOME SHARED MEDIA

(71) Applicant: BOSE CORPORATION, Framingham, MA (US)

(72) Inventors: Anne Marie Legge, Grafton, MA (US); Krishnakumar Subramanian, Shrewsbury, MA (US); Sean Madigan, Natick, MA (US)

(73) Assignee: BOSE CORPORATION, Framingham, MA (US)

( * ) Notice: Subject to any disclaimer, the term of this patent is extended or adjusted under 35 U.S.C. 154(b) by 223 days.

(21) Appl. No.: 16/558,947

(22) Filed: Sep. 3, 2019

(65) Prior Publication Data

US 2021/0065700 A1 Mar. 4, 2021

(51) Int. Cl.
*G10L 15/22* (2006.01)
*H04N 21/6587* (2011.01)
*H04N 21/422* (2011.01)

(52) U.S. Cl.
CPC ....... *G10L 15/22* (2013.01); *H04N 21/42203* (2013.01); *H04N 21/6587* (2013.01); *G10L 2015/223* (2013.01)

(58) Field of Classification Search
CPC ..... H04L 51/10; H04L 51/18; H04N 21/4788; G10L 15/00
See application file for complete search history.

(56) References Cited

U.S. PATENT DOCUMENTS

| | | | |
|---|---|---|---|
| 2014/0280498 A1* | 9/2014 | Frankel | H04L 65/4084 709/203 |
| 2017/0093943 A1* | 3/2017 | Alsina | H04L 67/1095 |
| 2017/0201852 A1* | 7/2017 | Kuang | H04L 63/083 |
| 2018/0324496 A1* | 11/2018 | Taylor | H04N 21/4788 |
| 2020/0228878 A1* | 7/2020 | Taylor | H04N 21/441 |
| 2020/0382601 A1* | 12/2020 | Smith | H04L 67/125 |
| 2021/0149622 A1* | 5/2021 | Falcon | H04L 65/1083 |

* cited by examiner

*Primary Examiner* — Daniel Abebe
(74) *Attorney, Agent, or Firm* — Patterson + Sheridan, LLP

(57) ABSTRACT

Certain aspects of the present disclosure are directed to techniques and apparatus for media coordination. One example method generally includes receiving, from a first user device, a command to play a voice message and media content at one or more second user devices, and determining whether one or more services accessible by the one or more second user devices can be used to play the media content. The method may also include coordinating the voice message and the media content to be played by the one or more second user devices based on the determination.

22 Claims, 4 Drawing Sheets

MULTI-HOME SHARED MEDIA

FIELD

The present disclosure relates to shared media, and more specifically, to techniques for media coordination.

BACKGROUND

Voice Assistant service providers are offering new services and upgrading existing services to enhance their subscribers' smart home and portable device experience. Subscribers have on-demand access to receive online services (e.g., news and weather) by voice or by typing commands within an application using services like automatic speech recognition (ASR) and natural language processing (NLP). Subscribers also have the ability to transmit electronic messages by voice or by typing within an application. For example, subscribers of voice assistant service providers such as Alexa or Google may request, listen/retrieve and respond/send audio information on a wide variety of topics or intents from servers located throughout the world. A server may be maintained by the service provider or by a third party provider who makes information and services available through the worldwide network of computers that make up the online service.

SUMMARY

Certain aspects of the present disclosure are directed to a method for media coordination. The method generally includes receiving, from a first user device, a command to play a voice message and media content at one or more second user devices, determining whether one or more services accessible by the one or more second user devices can be used to play the media content, and coordinating the voice message and the media content to be played by the one or more second user devices based on the determination.

In certain aspects, the method also includes determining a time to play the voice message and media content, wherein the coordinating of the voice message and the media content comprises making the voice message and the media content available to be played at the one or more second user devices at the determined time. In certain aspects, when the one or more services are accessible by the one or more second user devices to play the media content, the coordinating comprises sending the voice message and an indication to play the media content to one or more second user devices. In certain aspects, the one or more services accessible by the one or more second user devices to play the media content is different than a service used by the first user device for playing the media content. In certain aspects, when no service is accessible by the one or more second user devices to play the media content, the coordinating of the media content to be played comprises sending one or more access tokens for use of a service by the one or more second user devices to play the media content. In certain aspects, when no service is accessible by the one or more second user devices to play the media content, the coordinating of the media content to be played comprises sending a message prompting the one or more second user devices to register with a service for playing the media content.

In certain aspects, the command indicates when to play the voice message at the one or more second user devices with respect to the media content. In certain aspects, the coordinating comprises sending, from a network entity, the voice message and an indication to play the media content to the one or more second user devices, the method further comprising sending a message to the first user device indicating at least one of: the command to play the voice message and the media content at the one or more second user devices has been received by the network entity for processing; the voice message and the indication to play the media content have been delivered to the one or more second user devices; or the voice message and media content have been played by the one or more second user devices.

In certain aspects, the method also includes receiving, from the first user device, an indication of a time at which the voice message and an indication to play the media content is to be sent to the one or more second user devices, wherein the coordination comprises sending the voice message and the indication to play the media content to the one or more second user devices at the indicated time. In certain aspects, the one or more second user devices are part of a preconfigured user group. In some cases, the one or more second user devices of the preconfigured user group share one or more capabilities or features associated with processing of the media content.

In certain aspects, the command comprises a voice command. In this case, converting the voice command to a digital command, the coordination of the voice message and the media content to be played by the one or more second user devices being in accordance with the digital command.

In certain aspects, the command comprises a digital command. In certain aspects, the media content comprises an image, video, animation, or audio. In certain aspects, the coordinating comprises sending the voice message and an indication to play the media content to the one or more second user devices, the method further comprising: determining whether the voice message and the indication to play the media content have been successfully delivered to the one or more second user devices; and resending the voice message and the indication to play the media content to the one or more second user devices if the voice message and the indication to play the media content was not successfully delivered.

Certain aspects of the present disclosure are directed to an apparatus for media coordination. The apparatus generally includes an interface configured to receive, from a first user device, a command to play a voice message and media content at one or more second user devices, and a processing system configured to determine whether one or more services accessible by the one or more second user devices can be used to play the media content, and coordinate the voice message and the media content to be played by the one or more second user devices based on the determination.

In certain aspects, when the one or more services are accessible by the one or more second user devices to play the media content, the coordinating comprises sending the voice message and an indication to play the media content to one or more second user devices. In certain aspects, the one or more services accessible by the one or more second user devices to play the media content is different than a service used by the first user device for playing the media content. In certain aspects, the interface is further configured to receive, from the first user device, an indication of a time at which the voice message and an indication to play the media content is to be sent to the one or more second user devices, wherein the coordination comprises sending the voice message and the indication to play the media content to the one or more second user devices at the indicated time.

In certain aspects, the command comprises a voice command, and wherein the interface comprises a voice conversion module configured to convert the voice command to a digital command, the coordination of the voice message and the media content to be played by the one or more second user devices being in accordance with the digital command.

Certain aspects of the present disclosure are directed to a computer-readable medium having instructions stored thereon to cause an apparatus to receive, from a first user device, a command to play a voice message and media content at one or more second user devices, determine whether one or more services accessible by the one or more second user devices can be used to play the media content, and coordinate the voice message and the media content to be played by the one or more second user devices based on the determination. In certain aspects, when the one or more services are accessible by the one or more second user devices to play the media content, the coordinating comprises sending the voice message and an indication to play the media content to one or more second user devices.

DETAILED DESCRIPTION

Figure 1:
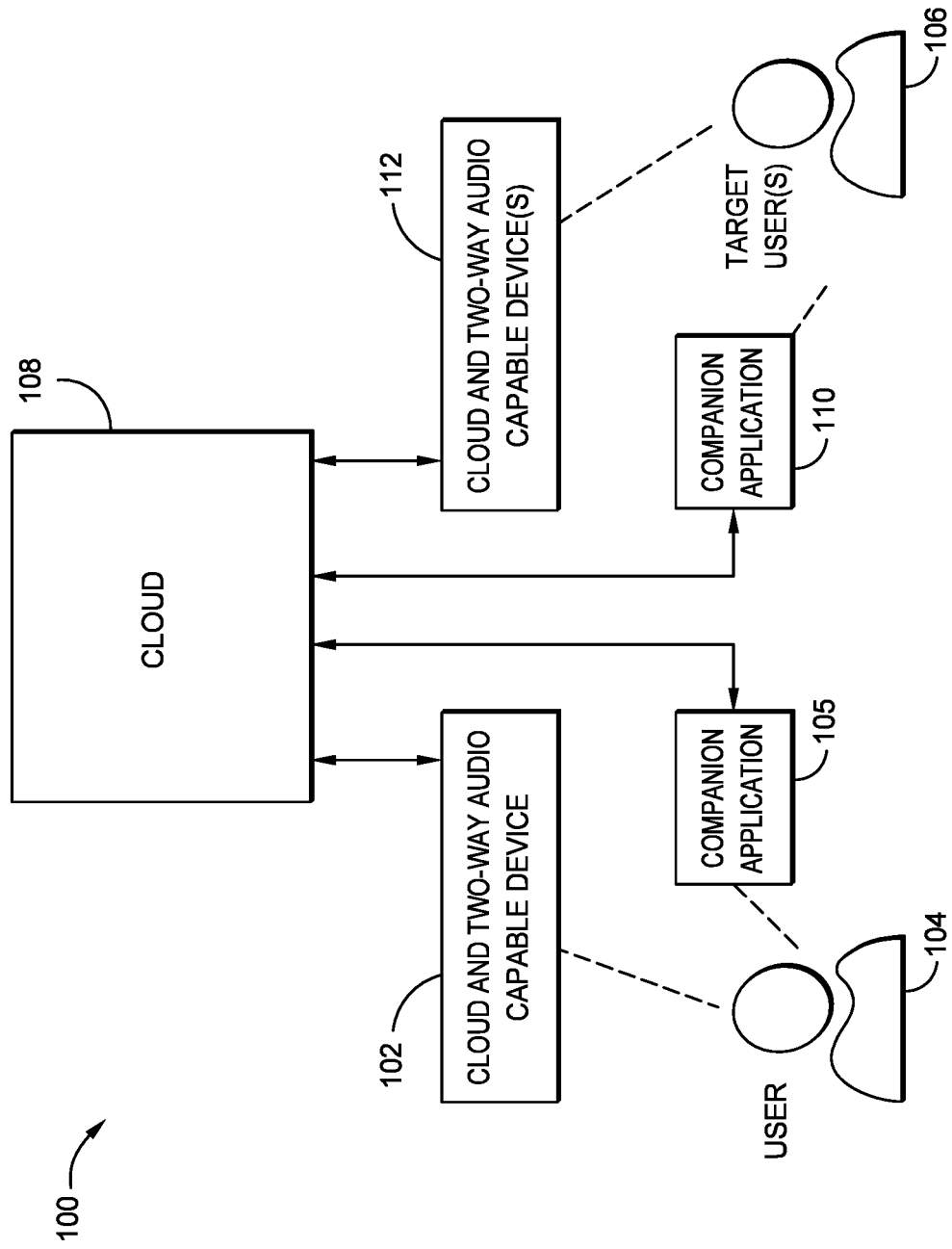
FIG. 1 illustrates a communication system for communicating a voice message and media content, in accordance with certain aspects of the present disclosure.

Certain aspects of the present disclosure are directed to apparatus and techniques for communication of voice and media content between users which may be part of separate local-area networks. For instance, the techniques described herein may enable a user (e.g., also referred to as a sender) to select media content, which may be curated for various events, to be played on a user device of one or more target users (e.g., also referred to as recipients) along with a voice message. As an example, a list of tracks may be presented to the sender on a user device that would be appropriate for specific events, such as birthdays or anniversaries, which the sender may select to be sent to the one or more target users, along with a recording of a voice message to be played. As used herein, a voice message may include a recording of any audio message by a user, and media content may include any suitable media or multi-media, such as video, audio, image, or animation (e.g., animation on a monitor or light bar of a user device).

Voice and/or audio messages are private online conversations between two or more people who have subscribed and been authenticated to a service provider's messaging service and have installed the corresponding software for communicating and playing the voice messages. Online conversations may be initiated in real-time or in a scheduled manner. The ability for a recipient to choose when they receive electronic data messages (e.g., a voice message) is becoming a preferred means of communication with many subscribers. Certain aspects of the present disclosure are generally directed to targeting and sending media content and voice message to a specific recipient or to a predetermined set of individuals that may form a group. For example, certain aspects of the present disclosure allow a single or a group voice message, along with media content, to be sent outside a sender's home local area network (LAN) to be played on an audio capable device. The media and voice message may be targeted to one or more individuals based on one or more profile groupings that may persist in a cloud application, as described in more detail herein.

Certain aspects of the present disclosure include receiving and authenticating messages and electronic media from a sender to a cloud enabled host for coordination of messages between a sender and one or more recipients. Certain aspects may also include determining features and capabilities of recipient and/or sender device(s) to facilitate communication between users. The features/capabilities of recipient(s) may be reported to a cloud entity, allowing the cloud entity to establish a communication channel between the sender and recipient(s) as well as grouping of users. In some aspects, a request to establish communication from the sender and/or the recipient may be received and authenticated by the cloud entity to establish the communication channel and groupings of users. Authentication may include identifying one or more internet connected devices and/or an internet-protocol (IP) address of the sender and/or the recipient.

Capabilities of the recipient(s) may be determined by identifying hardware, software, or eligible media providers (also referred to as services) associated with (e.g., available to) the recipient. For instance, the cloud entity may determine a service (e.g., Amazon music) available to a recipient for playing media content (e.g., a song), which may be the same or a different service that is available to the sender that selected the media content to be played. Certain aspects also provide various techniques for managing a scenario where a service for playing the media content is unavailable to the recipient, as described in more detail herein.

In some implementations, a user interface may be displayed to a user on a user device according to the capabilities of the recipient device (also referred to herein as a user device). Voice and/or audio communication may be enabled by establishing a generic signaling interface channel, a control channel, and an audio channel between the sender and the recipient(s). These and other general aspects may be implemented by an internet connected device and/or by a computer program stored on a computer readable medium, as described in more detail herein.

FIG. 1 illustrates a communication system 100 for communicating a voice message and media content, in accordance with certain aspects of the present disclosure. The communication system 100 allows for group play outside the home LAN of a user 104 (also referred to herein as a "sender"). For example, the user 104 may use a cloud and two-way audio capable device 102 or a companion application of a user-equipment (UE) 105 (e.g., mobile device) to play a voice message and multi-media content onto different speakers outside the user's LAN, which may be facilitated by a profile groupings that may be preset by the user 104, and in some aspects, accepted by the user 106 (also referred to as a "recipient") of the messaging. As used herein a user device generally refers to a suitable device to facilitate communication by a user with the cloud, such as the cloud and two-way audio capable device 102 and/or a companion application of the UE 105. A voice message generated by the user 104, along with media content selected by the user 104, may be communicated to a cloud entity 108. The cloud entity 108 may then coordinate the voice message and the media content to be played by a companion application of a UE 110, or a cloud and two-way audio capable device 112 of the user 106 (recipient). As used herein, a cloud entity may be implemented using one or more computing systems, each including one or more processing units, memory, networking systems, and various interfaces for data communication. While only a single recipient (user 106) is depicted in FIG. 1, multiple recipients may be the target of the voice message and media content described herein.

In certain aspects, the user 104 may have different profile groupings such as family, party friends, book club, political friends, to name a few, allowing the user to broadcast different messages to different groups of people with whom the user 104 may have different engagement levels and experiences. The aspects described herein may implement an asynchronous communication scheme that allows the user 106 (recipient) to listen to a message and playback of media content from user 104 at a time that the user 106 (recipient) prefers. For example, in some aspects, the user 106 may have the option to block any profile group at different times. For instance, the user 106 may block a work user group during the weekend and a bible user group during working hours. Once unblocked, all queued up messages and media content may be made available to play in any order, or may be played in the order in which they were sent.

As a sender, the user 104 may have the ability to schedule when the messaging is to be sent. For instance, the user 104 may indicate the time at which voice message and media content may be made available to one or more recipients. The voice message and indication of the media content may persist (stored) at the cloud entity 108 and sent to the user device of the user 106 (recipient) at the time indicated by the user 104. For instance, the user 104 may have a family member who has moved to Italy and may want to prepare a message/playback at a time that is convenient for the user 104 but arrives at the user device of the recipient at a time that is convenient for the receiver due to time zones differences.

In certain aspects, a recipient may accept a sender's request (e.g., from user 104) and both the sender and recipient may be authenticated and authorized to use a service for communication of voice message and media content, as described herein. In certain aspects, a sender may broadcast different introduction messages (e.g. voice messages), followed by media content to a recipient or groups of recipients, after user registration, device registration, media registration and group configuration is completed, as described in more detail herein.

As described herein, aspects of the present disclosure provide an asynchronous communication technique allowing a recipient to receive an optional introduction voice message, followed by curated (or not curated) media content, either immediately or at a determined date and time. Digital acknowledgment of message(s) delivery may be implemented via a persistence layer, as described in more detail herein. Recipient(s) (e.g., user 106) may play the media content and voice message immediately or elect to play the content at a future date/time depending on specific settings of the user device. Upon opening and playing the received content, an acknowledgement may be sent back to the sender (e.g., user 104) via the cloud entity 108. One or more other acknowledgement messages may also be communicated, as described in more detail herein.

The use of services described herein may be augmented with the optional use of the companion application of the UE 105, as described herein. In some cases, the companion application may act as a product controller for cloud enabled two-way audio capable devices (e.g., cloud and two-way audio capable device 102). The companion application may allow digital processing of the media content, as well as the delivery, opening, playback, and acknowledgment of the messages. Additional experiences, like pre-curated content by occasion may be developed and easily selectable by the sender within the companion application. The companion application described herein may be used to setup profiles (e.g., including information such as grouping of users and devices, blocked times (e.g., do not disturb times), and time zone information). The companion application may also be used as an interface for selection from a curated list of media content.

In certain aspects, electronic data may transferred between users (e.g., user 104 and user 106) of a communications system by enabling instant messaging communication between a sender and at least one recipient through an instant messaging host that may be facilitated by the companion application or the cloud and two-way audio capable devices described herein. In addition, voice communication may be enabled between the sender and the recipient through the messaging host.

Figure 2:
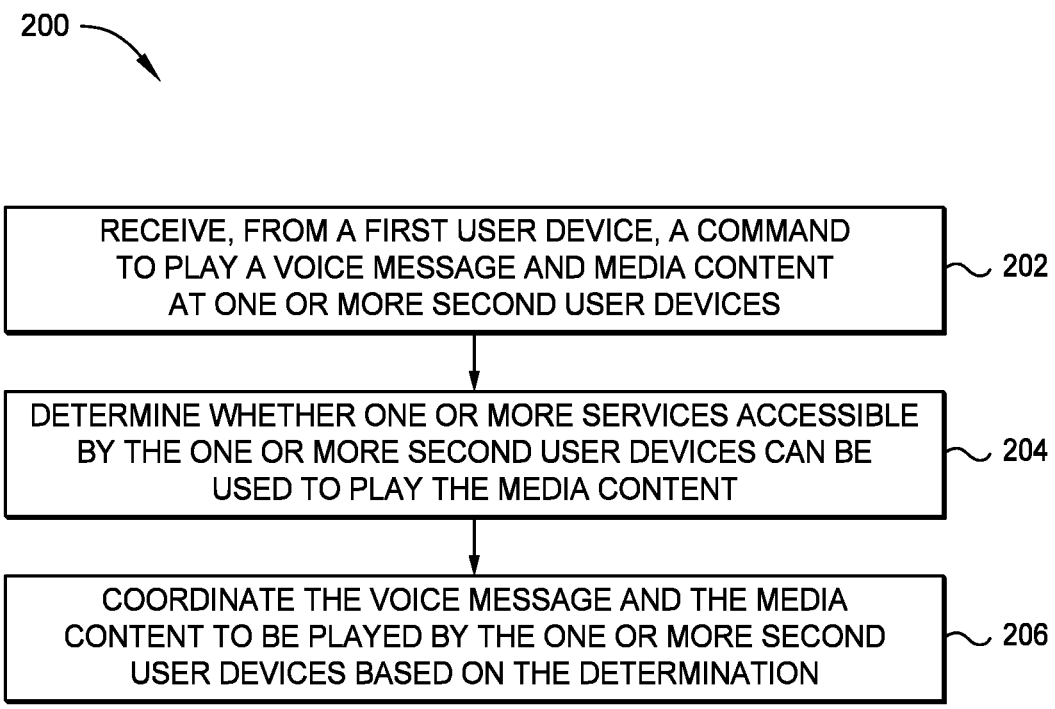
FIG. 2 is a flow-diagram illustrating example operations for media coordination, in accordance with certain aspects of the present disclosure.

FIG. 2 is a flow-diagram illustrating example operations 200 for media coordination, in accordance with certain aspects of the present disclosure. The operations 200 may be performed by a cloud entity, such as the cloud entity 108.

The operations 200 begin, at block 202, by the cloud entity receiving, from a first user device (e.g., user 104), a command to play a voice message and media content at one or more second user devices (e.g. user 106). At block 204, the cloud entity determines whether one or more services accessible by the one or more second user devices can be used to play the media content, and at block 206, coordinates the voice message and the media content to be played by the one or more second user devices based on the determination. In some cases, the cloud entity may also determine a time to play the voice message and media content. In this case, the coordinating, at block 206, of the voice message and the media content may include making the voice message and the media content available to be played at the one or more second user devices (recipient(s)) at the determined time. In some cases, the command may also indicate when to play the voice message at the one or more second user devices with respect to the media content. For example, the first user (e.g., user 104) may indicate whether the voice message is to be played before, during, or after the media content.

In certain aspects, the cloud entity may receive, from the first user device, an indication of a time at which the voice message and an indication to play the media content is to be sent to the one or more second user devices. In this case, the coordination at block 206 may include sending the voice message and the indication to play the media content to the one or more second user devices at the indicated time. As described herein, the one or more second user devices (recipient(s)) may be part of a preconfigured user group. For example, the one or more second user devices of the preconfigured user group may share one or more features or capabilities associated with processing of the media content. For example, all users able to play video on a user device may be part of the same group.

In certain aspects, the command may be a digital command. For example, the digital command may be sent via a companion application accessible by the first user. In other aspects, the command may be a voice command. In this case, the operations 200 may also include the cloud entity converting the voice command to a digital command, the coordination of the voice message and the media content to be played by the one or more second user devices being in accordance with the digital command.

In certain aspects, the coordinating, at block 206, may include sending the voice message and an indication to play the media content to the one or more second user devices. In this case, the operations 200 may also include determining whether the voice message and the indication to play the media content have been successfully delivered to the one or more second user devices, and resending the voice message and the indication to play the media content to the one or more second user devices if the voice message and the indication to play the media content was not successfully delivered. In otherwords, the cloud entity may store the voice message and indication of media content, allowing the cloud entity to resend the voice message and indication of media content in case the messaging was not successfully received by the recipient.

Figure 3:
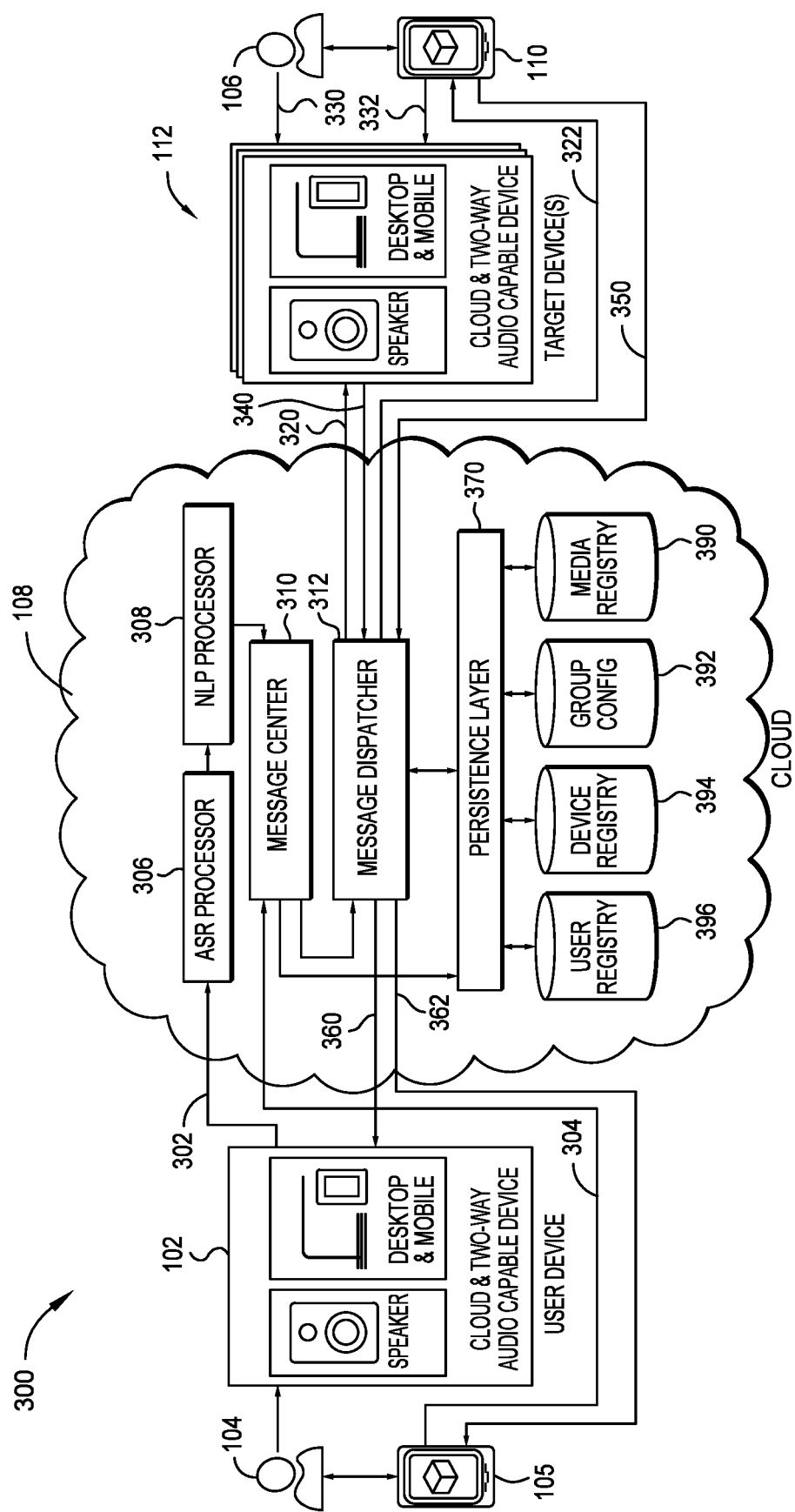
FIG. 3 illustrates a communication system for implementing techniques for transferring electronic data, in accordance with certain aspects of the present disclosure.

FIG. 3 illustrates a communication system 300 for implementing techniques for transferring electronic data, in accordance with certain aspects of the present disclosure. While certain elements in FIG. 3 are illustrated as monolithic entities to facilitate understanding, each element may include numerous interconnected computers and components designed to perform a set of specified operations and/or dedicated to a particular geographical region.

As illustrated, the user 104 may send a verbal command to the cloud and two-way audio capable device 102, which may send the verbal command to the cloud entity 108 via path 302. In other cases, the user 104 may use to the companion application of UE 105 to generate a digital command to be sent to the cloud entity via path 304. The verbal or digital commands (generally referred to herein as a "command") may be one of various suitable commands such as a wake-up word, message content to be played, message recipient(s), the media content to be played, and/or scheduling information such as the delivery scheduling of a message to one or more recipients, or a lock schedule. In some cases, a recipient may have multiple devices (e.g., cloud and two-way audio capable devices). A verbal or digital command may be specific to all, a subset, or a single one of the multiple devices associated with a recipient. For instance, the command may indicate media content to be played on the target user device. The sender's device may send an indication of the media and voice message to the cloud entity 108. The sender's device may also process acknowledgment messages related to the delivery and receipt of corresponding messages, as described in more detail herein.

Within the cloud entity 108, voice messages may be processed via a voice conversion module, which may include an automatic speak recognition (ASR) processor 306 and natural language processing (NLP) processor 308, prior to construction of a message, via the message creator module 310, and dispatch of the message, via the message dispatcher module 312, to the cloud and two-way audio capable device(s) 112 or UE(s) 110 of the recipient(s). Within the cloud application, acknowledgments of deliveries may be sent back to the sender's device, as described in more detail herein.

Certain aspects of the present disclosure are directed to techniques for acknowledging whether messages have been successfully delivered and/or played by one or more recipient. For example, the coordinating, at block 206, may include the cloud entity sending the voice message and an indication to play the media content to the one or more second user devices (recipients). In this case, the operations 200 may also include the cloud entity sending a message to the first user device indicating that (1) the command to play the voice message and the media content at the one or more second user devices has been received by the network entity for processing, (2) the voice message and the indication to play the media content have been delivered to the one or more second user devices, and/or (3) the voice message and media content have been played by the one or more second user devices.

In some cases, messages may be stored and resent at a later time if not successfully delivered during an initial attempt. For instance, the operations 200 may include the cloud entity determining whether the voice message and the indication to play the media content have been successfully delivered to the one or more second user devices, and resending the voice message and the indication to play the media content to the one or more second user devices if the voice message and the indication to play the media content was not successfully delivered. In other words, within the cloud entity 108, messages sent digitally or verbally may be constructed by a message creator 310 which may persist the message via persistence layer 370 to enable re-sending in the event of dispatch failure. Upon receipt of the created message, the dispatcher module 312 will transmit the message and will then persist acknowledgment that the message was sent to be communicated back to the sender's user device.

At the recipient, a recipient's device and companion application may receive a multi part or single part media voice message via respective paths 320, 322. The recipient device then relays acknowledgment of receipt, without explicit acknowledge from the recipient user (e.g., without confirmation that the message has been opened or played), back to the message dispatcher (e.g., via path 340 or path 350), for ultimate deliver to the sender's user device for verbal confirmation to the sender or digital confirmation on the companion application of the sender.

Opening/playing the media and voice message by the recipient may result in relay of an acknowledgement that the message has been opened by the recipient. Playback of the message may be initiated either when the recipient issues a voice command 330 to the recipient's user device or the recipient issues a digital command 332 to the cloud and two-way audio capable device 112 (or directly to the cloud entity) via the companion application. If playback is initiated by the recipient, the cloud and two-way audio capable device 112 may relay the acknowledgement message to the cloud entity 108 via path 340 for dispatch to the sender. If playback is initiated by the user, the companion application may send this acknowledgement message via path 350. The acknowledgement message is then sent to the sender's device and their companion application via the dispatcher module 312, via respective paths 360, 362.

In certain aspects, the cloud entity 108 may include one or more registries to store information to be used to facilitate the communication of voice and media messages described herein. For example, the cloud entity 108 may include a media registry 390 to store media related information. For instance, as described with respect to FIG. 2, the cloud entity may determining whether one or more services accessible by the one or more second user devices can be used to play the media content. The service related information of the users may be stored via the media registry 390.

In some cases, the one or more services accessible by the one or more second user devices (recipients) to play the media content may be different than a service used by the first user device (sender) for playing the media content. In other cases, the cloud entity 108 may determine that no service is accessible by the recipients to play the media content. When no service is accessible by the one or more second user devices (recipients) to play the media content, the coordinating, at block 204 of FIG. 2, of the media content to be played may include sending one or more access tokens for use of a service by the one or more second user devices to play the media content. In other words, the sender may have one or more access tokens that allow one or more recipients to play media content using one or more service(s) (e.g., Amazon music) associated with the one or more tokens. The token may be sent to a recipient who otherwise does not have access (e.g., subscription) that enabled the recipient to listen to the media content selected by the sender. In other aspects, when no service is accessible by the one or more second user devices to play the media content, the coordinating, at block 204 of FIG. 2, of the media content to be played may include sending a message prompting the one or more second user devices to register with a service (e.g., Amazon music) for playing the media content.

The cloud entity 108 may also include a group configuration registry 392 for storing information for grouping of users, as described herein. For instance, the group configuration registry 392 may store information regarding which users are part of which user groups. The cloud entity 108 may include a device registry 394 which may store information regarding user devices such as the supported capabilities or features of the devices as well as a user registry 396 for storing user information (e.g., name, address, etc.).

Figure 4:
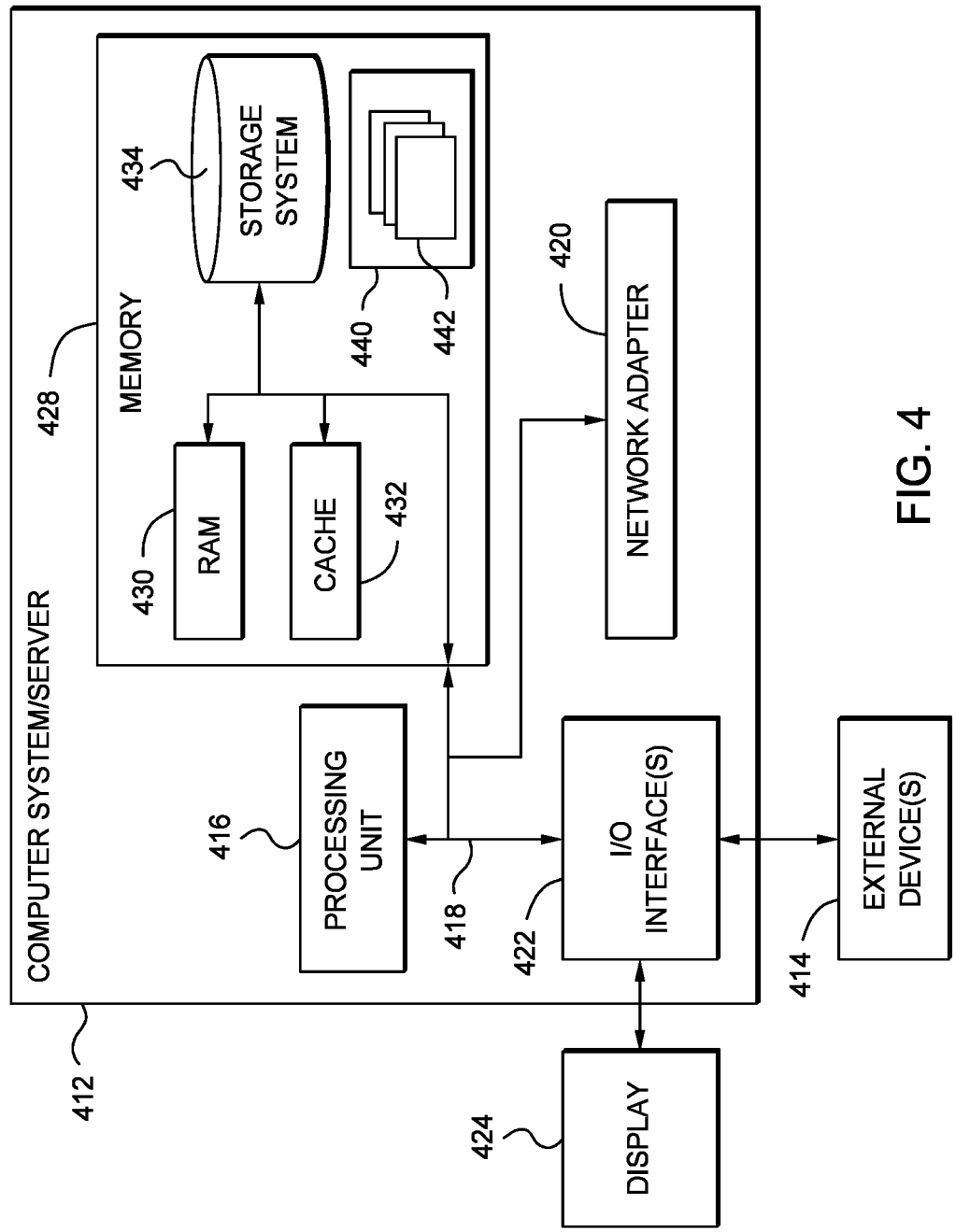
FIG. 4 is a schematic of an example of a computing device.

FIG. 4 is a schematic of an example of a computing device 410, such as a cloud entity (e.g., cloud entity 108) or a user device. The computing device 410 is only one example of a suitable computing device and is not intended to suggest any limitation as to the scope of use or functionality of aspects described herein. In computing device 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, hand-held or laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing device 410 is shown in the form of a general-purpose computing device. The components of computer system/server 412 may include, but are not limited to, one or more processors or processing units 416, a system memory 428, and a bus 418 that couples various system components including system memory 428 to processing unit 416.

Bus 418 represents one or more of any of several types of bus structures, including a memory bus or memory controller, a peripheral bus, an accelerated graphics port, and a processor or local bus using any of a variety of bus architectures. Computer system/server 412 may include a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of aspects described herein.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via I/O interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418.

Aspects of the present disclosure may take the form of an entirely hardware implementation, an entirely software implementation (including firmware, resident software, micro-code, etc.), or an implementation combining software and hardware aspects that may all generally be referred to herein as a "circuit," "module," or "system." The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some examples, electronic circuitry including, for example, programmable logic circuitry, field-programmable gate arrays (FPGAs), or programmable logic arrays (PLAs) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to examples of the present disclosure, other and further examples of the disclosure may be devised without departing from the basic scope thereof, and the scope thereof is determined by the claims that follow.

What is claimed is:

1. A method for media coordination at one or more second user devices, comprising:
   receiving, from a first user device, a command to play a voice message and media content at the one or more second user devices, the command received via a companion application accessible by the first user device;
   determining whether the one or more second user devices are capable of accessing one or more services hosting the media content to play the media content; and
   coordinating the voice message and the media content to be played by the one or more second user devices based on the determination and the command received from the first user device, wherein the command comprises indications of start times for the voice message and media content.

2. The method of claim 1, further comprising determining a time to play the voice message and media content, wherein the coordinating of the voice message and the media content comprises making the voice message and the media content available to be played at the one or more second user devices at the determined time.

3. The method of claim 1, wherein, when the one or more services are accessible by the one or more second user devices to play the media content, the coordinating comprises sending the voice message and an indication to play the media content to one or more second user devices.

4. The method of claim 1, wherein the one or more services accessible by the one or more second user devices to play the media content is different than a service used by the first user device for playing the media content.

5. The method of claim 1, wherein, when no service is accessible by the one or more second user devices to play the media content, the coordinating of the media content to be played comprises sending one or more access tokens for use of a service by the one or more second user devices to play the media content.

6. The method of claim 1, wherein, when no service is accessible by the one or more second user devices to play the media content, the coordinating of the media content to be played comprises sending a message prompting the one or more second user devices to register with a service for playing the media content.

7. The method of claim 1, wherein the command indicates when to play the voice message at the one or more second user devices with respect to the media content.

8. The method of claim 1, wherein the coordinating comprises sending, from a network entity, the voice message and an indication to play the media content to the one or more second user devices, the method further comprising sending a message to the first user device indicating at least one of:
the command to play the voice message and the media content at the one or more second user devices has been received by the network entity for processing;
the voice message and the indication to play the media content have been delivered to the one or more second user devices; or
the voice message and media content have been played by the one or more second user devices.

9. The method of claim 1, further comprising:
receiving, from the first user device, an indication of a time at which the voice message and an indication to play the media content is to be sent to the one or more second user devices, wherein the coordination comprises sending the voice message and the indication to play the media content to the one or more second user devices at the indicated time.

10. The method of claim 1, wherein the one or more second user devices are part of a preconfigured user group.

11. The method of claim 10, wherein the one or more second user devices of the preconfigured user group share one or more capabilities or features associated with processing of the media content.

12. The method of claim 1, wherein the command comprises a voice command, the method further comprising:
converting the voice command to a digital command, the coordination of the voice message and the media content to be played by the one or more second user devices being in accordance with the digital command.

13. The method of claim 1, wherein the command comprises a digital command.

14. The method of claim 1, wherein the media content comprises an image, video, animation, or audio.

15. The method of claim 1, wherein the coordinating comprises sending the voice message and an indication to play the media content to the one or more second user devices, the method further comprising:
determining whether the voice message and the indication to play the media content have been successfully delivered to the one or more second user devices; and
resending the voice message and the indication to play the media content to the one or more second user devices if the voice message and the indication to play the media content was not successfully delivered.

16. An apparatus for media coordination, comprising:
an interface configured to receive, from a first user device, a command to play a voice message and media content at one or more second user devices, the command received via a companion application on the one or more second user devices accessible by the first user device; and
a processing system configured to:
determine whether the one or more second user devices are capable of accessing one or more services hosting the media content to play the media content; and
coordinate the voice message and the media content to be played by the one or more second user devices based on the determination and the command received from the first user device, wherein the command comprises indications of start times for the voice message and media content.

17. The apparatus of claim 16, wherein, when the one or more services are accessible by the one or more second user devices to play the media content, the coordinating comprises sending the voice message and an indication to play the media content to one or more second user devices.

18. The apparatus of claim 16, wherein the one or more services accessible by the one or more second user devices to play the media content is different than a service used by the first user device for playing the media content.

19. The apparatus of claim 16, wherein the interface is further configured to: receive, from the first user device, an indication of a time at which the voice message and an indication to play the media content is to be sent to the one or more second user devices, wherein the coordination comprises sending the voice message and the indication to play the media content to the one or more second user devices at the indicated time.

20. The apparatus of claim 16, wherein the command comprises a voice command, and wherein the interface comprises a voice conversion module configured to convert the voice command to a digital command, the coordination of the voice message and the media content to be played by the one or more second user devices being in accordance with the digital command.

21. A computer-readable medium having instructions stored thereon to cause an apparatus to:
receive, from a first user device, a command to play a voice message and media content at one or more second user devices, the command received via a companion application accessible by the first user device;
determine whether the one or more second user devices is capable of accessing one or more services hosting the media content to play the media content; and coordinate the voice message and the media content to be played by the one or more second user devices based on the determination and the command received from the first user device, wherein the command comprises indications of start times for the voice message and media content.

22. The computer-readable medium of claim 21, wherein, when the one or more services are accessible by the one or more second user devices to play the media content, the coordinating comprises sending the voice message and an indication to play the media content to one or more second user devices.

* * * * *